United States Patent
Bennett

(10) Patent No.: US 11,130,698 B2
(45) Date of Patent: Sep. 28, 2021

(54) GLASS SHEET FORMING AND ANNEALING SYSTEM PROVIDING EDGE STRESS CONTROL

(71) Applicant: GLASSTECH, INC., Perrysburg, OH (US)

(72) Inventor: Terry A. Bennett, Northwood, OH (US)

(73) Assignee: GLASSTECH, INC., Perrysburg, OH (US)

( * ) Notice: Subject to any disclaimer, the term of this patent is extended or adjusted under 35 U.S.C. 154(b) by 735 days.

(21) Appl. No.: 15/871,385

(22) Filed: Jan. 15, 2018

(65) Prior Publication Data

US 2018/0134601 A1    May 17, 2018

Related U.S. Application Data

(62) Division of application No. 14/551,226, filed on Nov. 24, 2014, now Pat. No. 9,896,369.

(51) Int. Cl.

| | |
|---|---|
| *C03B 25/02* | (2006.01) |
| *C03B 35/20* | (2006.01) |
| *C03B 25/08* | (2006.01) |
| *C03B 27/04* | (2006.01) |
| *C03B 23/03* | (2006.01) |
| *C03B 23/023* | (2006.01) |
| *C03B 40/027* | (2006.01) |
| *C03B 27/044* | (2006.01) |

(52) U.S. Cl.
CPC ...... *C03B 23/0307* (2013.01); *C03B 23/0235* (2013.01); *C03B 25/025* (2013.01); *C03B 27/044* (2013.01); *C03B 27/0413* (2013.01); *C03B 35/207* (2013.01); *C03B 40/027* (2013.01); *C03B 25/08* (2013.01); *C03B 2225/02* (2013.01)

(58) Field of Classification Search
CPC .............. C03B 23/0357; C03B 11/125; C03B 23/0258; C03B 23/03; C03B 23/0252; C03B 11/12; C03B 29/08; C03B 23/0305; C03B 23/0256

See application file for complete search history.

(56) References Cited

U.S. PATENT DOCUMENTS

| | | | |
|---|---|---|---|
| 3,846,104 A | | 11/1974 | Seymour |
| 3,951,634 A | * | 4/1976 | Hall ...................... C03B 35/202 |
| | | | 65/104 |

(Continued)

FOREIGN PATENT DOCUMENTS

| | | |
|---|---|---|
| CN | 1126180 A | 7/1996 |
| CN | 103118997 A | 5/2013 |

OTHER PUBLICATIONS

PCT International Search Report and Written Opinion dated Jan. 21, 2016, Application No. PCT/US2015/058011, Applicant Glasstech, Inc., 8 Pages.

(Continued)

*Primary Examiner* — Jodi C Franklin
(74) *Attorney, Agent, or Firm* — Brooks Kushman P.C.

(57) ABSTRACT

A glass sheet forming and annealing system disclosed provides control of edge stresses by maintaining a press formed glass sheet on an annealing ring (72) below a heated upper forming mold (58) within a forming station (12) for slow cooling toward the glass strain point temperature.

8 Claims, 6 Drawing Sheets

(56) References Cited

U.S. PATENT DOCUMENTS

| | | | |
|---|---|---|---|
| 3,973,943 A | | 8/1976 | Seymour |
| 4,222,763 A | | 9/1980 | McMaster |
| 4,233,048 A | | 11/1980 | Gintert |
| 4,260,408 A | | 4/1981 | Reese et al. |
| 4,260,409 A | | 4/1981 | Reese et al. |
| 4,475,937 A | * | 10/1984 | Nitschke ............... B65G 43/10 |
| | | | 65/163 |
| 4,461,023 A | | 11/1984 | Marechal et al. |
| 4,661,139 A | | 4/1987 | Reese et al. |
| 4,877,437 A | | 10/1989 | Nitschke |
| 5,279,635 A | * | 1/1994 | Flaugher ............. C03B 23/0307 |
| | | | 65/103 |
| 5,376,158 A | | 12/1994 | Shetterly et al. |
| 5,383,950 A | * | 1/1995 | Hashemi ............. C03B 27/0442 |
| | | | 65/288 |
| 5,385,786 A | | 1/1995 | Shetterly et al. |
| 5,437,703 A | * | 8/1995 | Jacques ................ C03B 23/035 |
| | | | 65/106 |
| 5,536,581 A | | 7/1996 | Shetterly et al. |
| 5,679,124 A | * | 10/1997 | Schnabel, Jr. ....... C03B 23/0252 |
| | | | 65/115 |
| 5,858,047 A | | 1/1999 | Frank et al. |
| 5,865,866 A | | 2/1999 | Schnabel, Jr. et al. |
| 5,951,733 A | | 9/1999 | Clark et al. |
| 6,015,619 A | | 1/2000 | Schnabel, Jr. et al. |
| 6,227,008 B1 | | 5/2001 | Shetterly et al. |
| 6,240,746 B1 | * | 6/2001 | Maeda ................ C03B 23/0235 |
| | | | 65/104 |
| 6,543,255 B2 | | 4/2003 | Bennett et al. |
| 6,578,383 B2 | | 6/2003 | Bennett et al. |
| 2003/0074922 A1 | * | 4/2003 | Lewandowski ....... F27B 9/2407 |
| | | | 65/119 |
| 2010/0129602 A1 | * | 5/2010 | Dejneka ................ C03B 11/122 |
| | | | 428/130 |
| 2011/0247367 A1 | | 10/2011 | Nitschke et al. |
| 2011/0302964 A1 | | 12/2011 | Nitschke et al. |
| 2012/0295072 A1 | | 11/2012 | Kato et al. |
| 2013/0091896 A1 | | 4/2013 | Nitschke et al. |
| 2013/0186138 A1 | | 7/2013 | Lewandowski et al. |

OTHER PUBLICATIONS

Taiwanese Search Report dated Dec. 10, 2018, Application No. 10721161980, 3 Pages.

* cited by examiner

GLASS SHEET FORMING AND ANNEALING SYSTEM PROVIDING EDGE STRESS CONTROL

CROSS-REFERENCE TO RELATED APPLICATIONS

This application is a divisional of U.S. patent application Ser. No. 14/551,226 filed on Nov. 24, 2014 by Terry A. Bennett under the title GLASS SHEET FORMING AND ANNEALING PROVIDING EDGE STRESS CONTROL, now U.S. Pat. No. 9,896,369, issued Feb. 20, 2018, the entire disclosure of which is hereby incorporated by reference.

TECHNICAL FIELD

This application discloses a glass sheet forming and annealing system that provides edge stress control.

BACKGROUND

When glass sheets are heated for forming and annealing, the glass sheet peripheral edge portions have oppositely facing surfaces and an edge surface that affect cooling and resultant tensile and compressive stresses after the annealing is completed. To meet certain manufacturing specifications for formed glass sheets that are annealed, these tensile and compressive stresses must be in a controlled range which can be difficult to achieve because of increased heating and cooling that takes place at the edge portions of the glass sheet as opposed to the central regions where there are effectively only two oppositely facing surfaces from which the glass is heated and cooled.

See U.S. Pat. No. 5,385,786 Shetterly et al.; U.S. Pat. No. 5,536,581 Shetterly et al.; U.S. Pat. No. 5,679,124 Schnabel, Jr. et al.; U.S. Pat. No. 5,865,866 Schnabel, Jr. et al.; U.S. Pat. No. 6,015,619 Schnabel, Jr. et al.; U.S. Pat. No. 6,543,255 Bennett et al.; and U.S. Pat. No. 6,578,383 Bennett et al., the entire disclosures of which are hereby incorporated by reference.

SUMMARY

An object of the present invention is to provide an improved system for glass sheet forming and annealing to control edge stresses.

In carrying out the above object, the system for glass sheet forming and annealing according to the invention includes a furnace for heating a glass sheet to its forming temperature, a forming station located adjacent the furnace, and a conveyor for conveying the heated glass sheet from the furnace to the forming station. The forming station has an upper forming mold which is heated and has a downwardly facing forming face. The forming station also has a lower forming mold that is movable upwardly to lift the heated glass sheet from the conveyor to the upper forming mold for pressing that provides the glass sheet with a formed shape, and a source of vacuum for drawing a vacuum at the upper forming mold to maintain the formed glass sheet on the upper forming mold as the lower mold is moved downwardly after the press forming. An annealing ring of the system is movable under the heated upper forming mold and the formed glass sheet supported thereon to receive the formed glass sheet upon termination of the vacuum drawn at the upper forming mold. A controller of the system controls operation of the forming station, the conveyor, and the annealing ring, and after the formed glass sheet is received by the annealing ring the controller is configured to maintain the annealing ring and the formed glass sheet thereon in the forming station below the heated upper forming mold for at least three seconds prior to movement from the forming station so as to provide slow cooling of the formed glass sheet toward the strain point temperature and thereby control edge stresses upon final cooling to ambient temperature.

The system is disclosed in one embodiment as having its furnace including a preforming end section having inclined bending rolls that preform the heated glass sheet prior to movement of the forming station for the press forming.

In another embodiment, the system is disclosed as including a roll conveyor having a flat plane of conveyance for conveying flat heated glass sheets to the forming station for the press forming.

As disclosed, the lower forming mold has four sides defining a ring shape and each side has a T-shaped cross section including a vertical stem and a crossbar supported on the vertical stem and having an upwardly facing forming surface. Each side of the lower forming mold has a pair of electrical heating elements at lower locations below its crossbar where it is supported on its vertical stem, and the forming face of the crossbar of each side has three grooves and three electrical heating elements respectively received within the three grooves to limit heat loss from the glass sheet to control edge stresses upon final cooling to ambient temperature.

As disclosed, the lower forming mold has insulation within the interior and around the exterior of its ring shape.

Also, the disclosed annealing ring includes vertically extending baffles at upstream and downstream locations relative to the direction of movement of the annealing ring from the forming station to limit cooling from air flow across the formed glass sheet during that movement. The vertically extending baffles as disclosed extend both upwardly and downwardly from the annealing ring. The annealing ring includes heaters and also includes insulation within and around its exterior to limit heat flow from the formed glass sheet to provide its slow cooling.

The controller of the system maintains the annealing ring and the formed glass sheet thereon in the forming station below the heated upper forming mold for at least five seconds, and for some glass sheets at least 6.5 seconds, prior to movement from the forming station for the slow cooling of the formed glass sheet toward the strain point temperature to control edge stresses upon final cooling to ambient temperature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
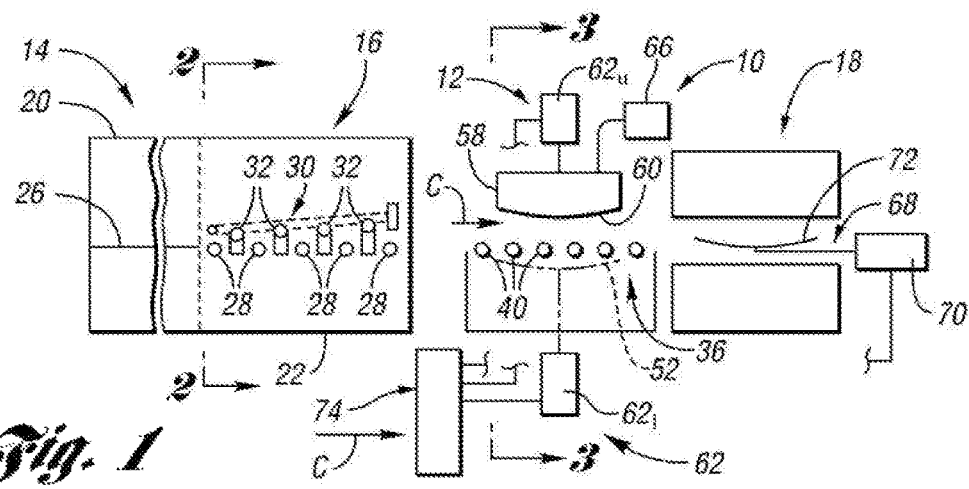
FIG. 1 is a schematic side elevational view of one embodiment of a system for glass sheet forming and annealing according to the invention.

With reference to FIG. 1 of the drawings, one embodiment of the system for forming and annealing glass sheets according to the invention is generally indicated by 10. The construction and method of operation of the system will be described in an integrated manner to facilitate an understanding of different aspects of the invention.

The system 10 includes a forming and annealing station 12 and also includes a furnace 14 that has a preforming end section 16 just upstream along a direction of conveyance C from the forming and annealing station 12. Downstream from the forming and annealing station 12 along the direction of conveyance C, the system 10 is illustrated as including a final cooling station 18 to which the formed glass sheet after initial cooling in the forming and annealing station is further cooled to ambient temperature.

As illustrated by continuing reference to FIG. 1, the furnace 14 has entry and exit ends 20 and 22 and includes a heating chamber 24 (FIG. 2) having a conveyor 26 for conveying glass sheets along the direction of conveyance through the furnace from the entry end to the exit end. The conveyor 26 on which the glass sheets are heated can be either a conventional gas hearth or a roll conveyor on which the glass sheets are conveyed during heating from ambient temperature to a sufficiently high temperature to permit bending.

Figure 2:
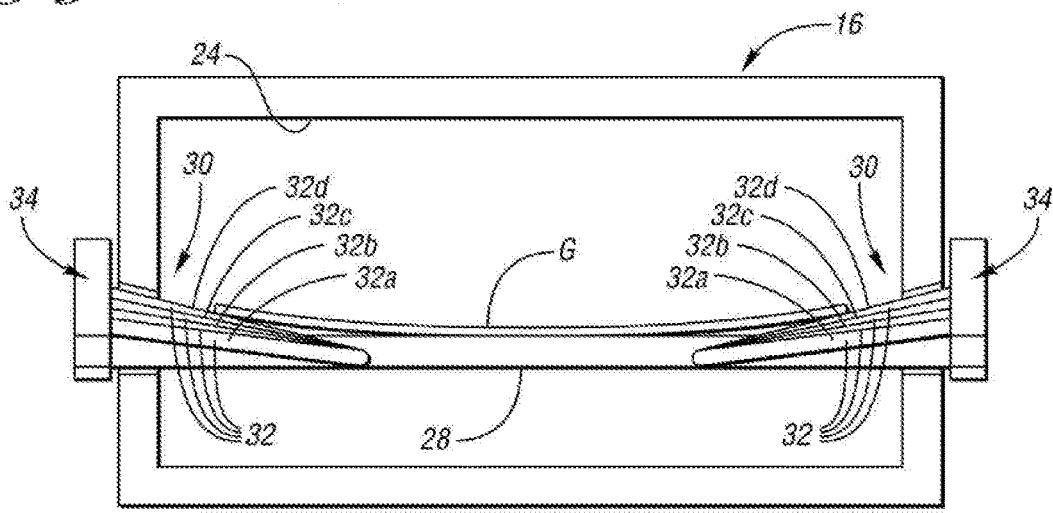
FIG. 2 is a schematic cross sectional view through the system taken along the direction of line 2-2 in FIG. 1 through a furnace preforming end section having horizontal and inclined rolls at which heated glass sheets are conveyed for initial roll forming prior to exiting the furnace in preparation for further forming.

The furnace exit end 22 includes the preforming end section 16 which is illustrated in FIG. 2 as having horizontally extending conveyor rolls 28 that are rotatively driven and spaced horizontally within the heating chamber along the direction of conveyance extending laterally with respect thereto to support and convey the heated glass sheets. The preforming end section 16 also includes a pair of sets 30 of bending rolls 32, with the bending roll sets 30 spaced laterally with respect to each other within the heating chamber 24 along the direction of conveyance. Each set of bending rolls 30 is supported and rotatively driven by a drive mechanism 34 with the bending rolls at progressively increasing inclinations along the direction of conveyance as illustrated by reference numerals 32$a$, 32$b$, 32$c$ and 32$d$ in FIG. 2. The conveyance of each heated glass sheet G along the direction of conveyance in cooperation with the bending rolls 32 provides bending or preforming of the heated glass sheet with an upwardly concave shape as illustrated in FIG. 2 along a direction transverse to the direction of conveyance.

With combined reference to FIGS. 1 and 3-5, the forming and annealing station 12 as previously mentioned is located externally of the furnace 14 downstream from its exit end 22 to receive the preformed glass sheets from the preforming end section 16. More specifically, the forming and annealing station 12 includes a conveyor 36 for receiving a heated glass sheet to be press bent. The conveyor 36 includes a lower support structure 38 and a bed of a plurality of conveyor assemblies 40 specifically indicated as $40_w$ and $40_r$ on the support structure. Each conveyor assembly 40, includes a horizontally extending elongated roller 41 located laterally at a central location of the conveyor. Each conveyor assembly $40_w$ has an upper wheel 44 for supporting and conveying upwardly formed portions of the preformed glass sheet within the press bending station. A drive mechanism provides rotational driving of the roller 41 and rotational driving of the wheel 44 of each wheel assembly 40, specifically $40_r$ or $40_w$, upon connection thereof to the lower support structure 38. For a more detailed description of the conveyor and the drive mechanism, refer to U.S. Pat. No. 6,543,255 and United States patent application Publication No. 2011/0247367, the entire disclosures of both of which are hereby incorporated by reference.

Figure 3:
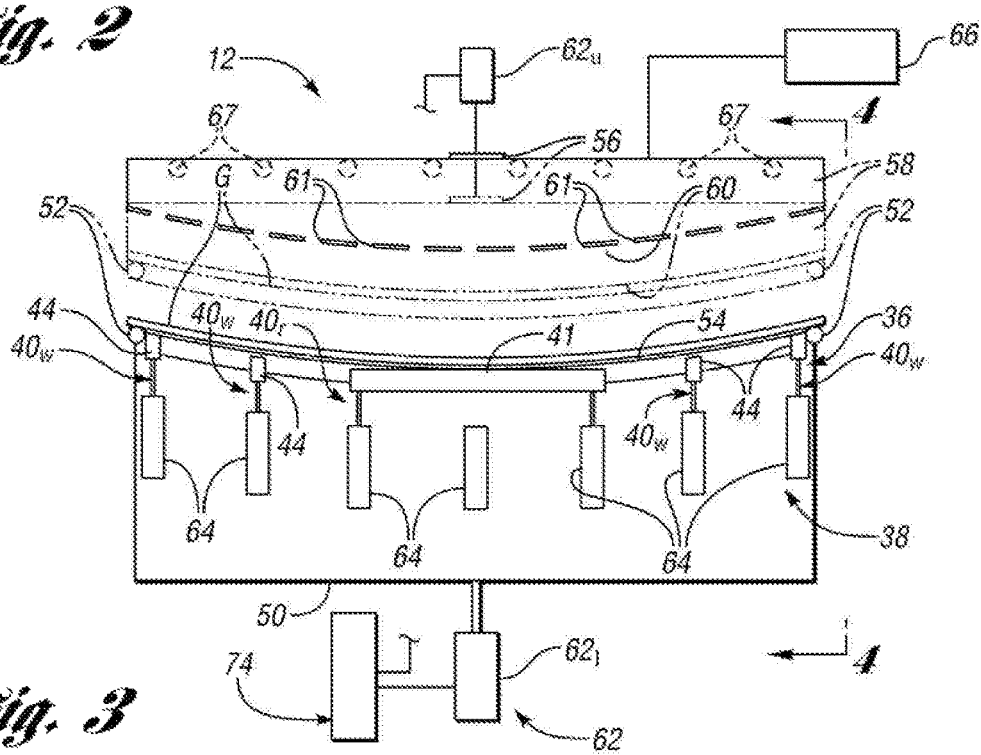
FIG. 3 is a schematic cross sectional view taken through the system along line 3-3 in FIG. 1 at a forming station thereof to illustrate the construction of a lower press ring assembly having a press ring and also illustrating the construction of an upper forming mold, which press ring and upper forming mold are movable as disclosed by the solid and phantom line indicated positions to press form the initially roll formed glass sheet.

As illustrated in FIG. 3, a lower mount of the forming and annealing station 12 is schematically illustrated at 50 and supports a lower forming mold that is disclosed as a lower press ring 52 having a concave curved shape 54 facing upwardly and being received within the conveyor 36 below the upper extremities of the horizontal rollers 41 and the wheels 44 of the conveyor assemblies $40_r$ or $40_w$ in a ring shape thereof where no conveyor assemblies are located. As further illustrated in FIG. 3, an upper mount 56 of the press station 12 supports an upper forming mold 58 having a downwardly facing curved forming face 60 complementary to the upwardly curved shape 54 of the lower press ring 52.

Figure 4:
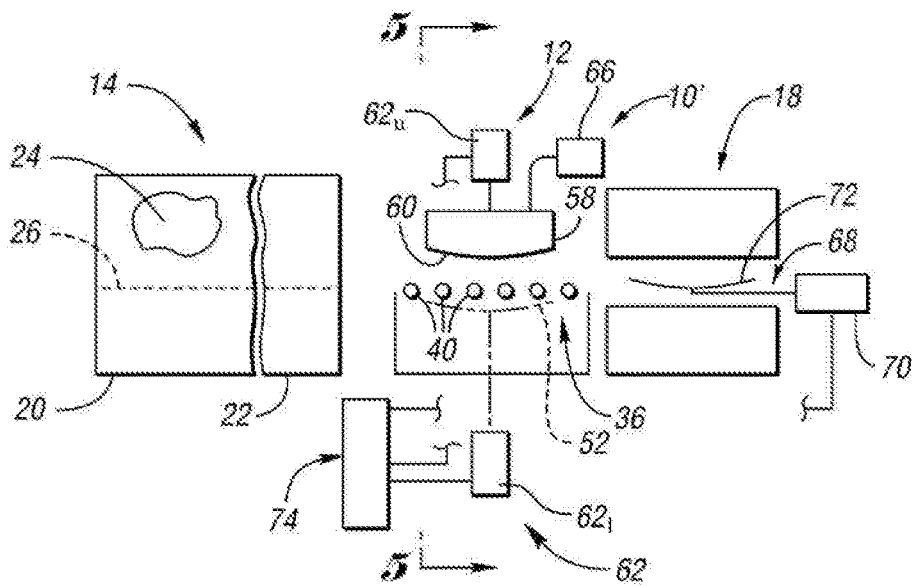
FIG. 4 is a schematic side elevational view similar to FIG. 1 of another embodiment of the glass sheet forming and annealing system according to the invention whose forming station forms and anneals a heated flat glass sheet received from the furnace.

An actuator assembly collectively indicated by 62 in FIGS. 3 and 4 includes lower and upper actuators $62_l$ and $62_u$ that provide vertical movement of the lower press ring 52 and upper forming mold 58 between the solid and phantom line positions of FIG. 3. This vertical movement lifts the preformed glass sheet upwardly from the conveyor 36 and provides press forming of the preformed glass sheet between the lower press ring 52 and the forming face 60 of the upper forming mold 58. After the press forming, the actuators $62_l$ and $62_u$ respectively move the lower press ring 52 downwardly and the upper forming mold 58 upwardly.

The conveyor 36 has a curved shape transverse to the direction of conveyance along which the conveyor assemblies receive the preformed glass sheet, with the curved shape corresponding to its preformed curved shape provided by the preforming end station 16 illustrated in FIG. 2. More specifically, the support structure 38 of the conveyor 36 includes a plurality of elongated supports or rails 64 that extend along the direction of conveyance and have different elevations as shown in FIG. 3 along a direction transverse to the direction of conveyance to provide the support and curved shape of the conveyor assemblies $40_r$ or $40_w$ of the conveyor 36.

Figure 5:
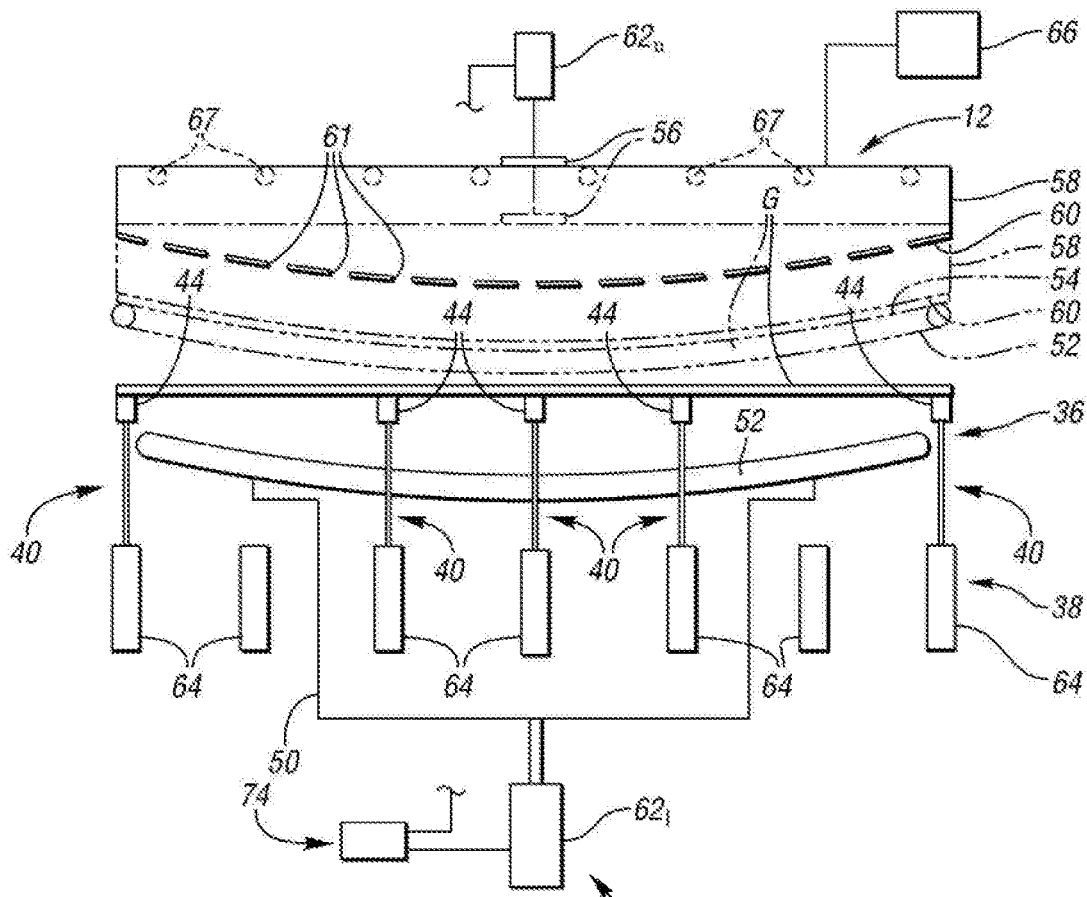
FIG. 5 is a cross sectional view taken along the direction of line 5-5 in FIG. 4 to further illustrate the flat shape of the glass sheet prior to its press forming and annealing as shown by phantom line representation.

With reference to FIGS. 4 and 5, another embodiment of the glass sheet forming and annealing system 10' is similar to the embodiment of FIGS. 1-3 but operates to provide positioning and forming of flat glass sheets without any preforming as with the previously described embodiment. Thus, like components thereof have the same reference numerals and same structures and much of the prior description is thus applicable except as will be noted. The furnace 14 may have its conveyor 26 use the same horizontal conveyor rolls 28 as those of the FIG. 1-3 embodiment but without the inclined bending rolls 32 that provide the preforming, and the conveyor 36 thus has its conveyor assemblies 40 receiving a heated flat glass sheet from the furnace. Thus, the furnace 16 may include the capability of installing or removing the inclined bending rolls depending upon which version is to be utilized.

With reference to FIGS. 1 and 4, the forming and annealing station 12 may have the lower press ring 52 and the forming face 60 of the upper press mold 58 provided with a straight shape along the direction of conveyance C or with a curved shape as shown along that direction in order to provide bending both along and transverse to the direction of conveyance. The upper press mold 58 has its forming face 60 provided with a vacuum through vacuum holes 61 from a vacuum source 66 so as to support the bent glass sheet after the press bending. The upper forming mold is heated by electric resistance heaters 67 that maintain the formed glass sheet hot as its annealing begins. The upper forming mold may also have: different areas supplied with different levels of vacuum by different chambers and/or distribution tubes; and positive pressure air supplied to the forming face to provide release of glass sheets supporting thereby, see U.S. Pat. No. 4,222,763 McMaster; U.S. Pat. No. 4,877,437 Nitschke.; U.S. Pat. No. 5,376,158 Shetterly et al.; U.S. Pat. No. 5,951,733 Clark et al.; and U.S. Pat. No. 6,227,008 Shetterly et al., the entire disclosures of which are hereby incorporated by reference.

Figure 6:
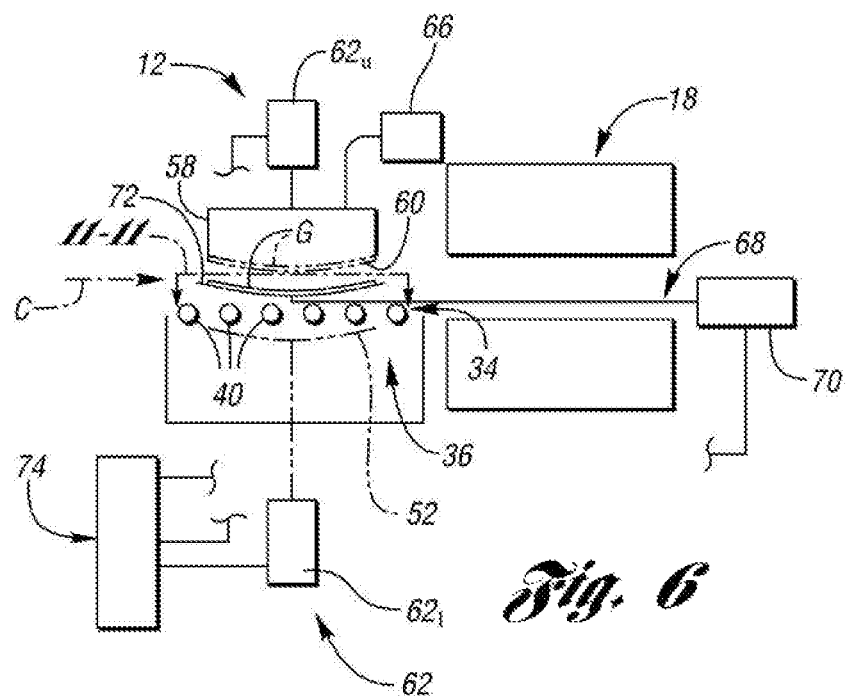
FIG. 6 is a schematic side elevational view similar to FIGS. 1 and 4 and illustrating the manner in which the formed glass sheet is released from the upper forming mold onto the annealing ring and then maintained within the forming station for a dwell time that slows cooling thereof toward the strain point temperature to provide control of the final edge stresses upon cooling to ambient temperature.
Figure 7:
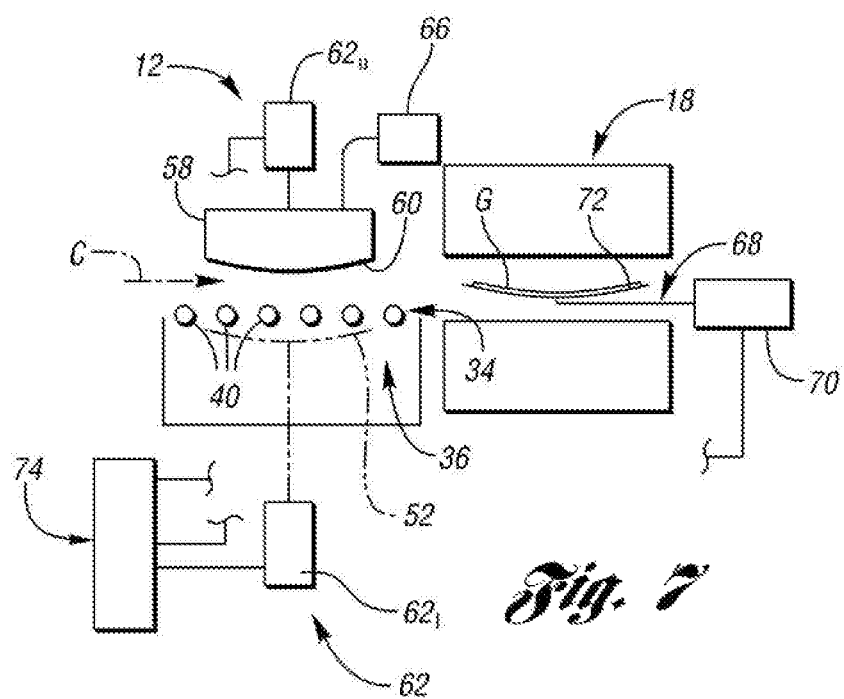
FIG. 7 is a view similar to FIG. 6 at a later stage after the formed glass sheet has been moved from the forming station to a cooling station for further cooling to the ambient temperature.

With reference to FIGS. 6 and 7, each embodiment of the forming and annealing system includes an annealing shuttle 68 having an actuator 70 and an annealing ring 72 that is moved by the actuator into the forming station 12 as shown in FIG. 6 and subsequently out of the forming station to the cooling station 18 as shown in FIG. 7.

After the press forming of the glass sheet G as illustrated by the phantom line portions of FIGS. 3 and 5 of the two embodiments, the source of vacuum 66 draws a vacuum in the upper forming mold 58 at its forming face 60 and the actuator assembly 62 by its lower and upper actuators $62_l$ and $62_u$ respectively move the lower press ring 52 downwardly and the upper forming mold upwardly to the position shown in FIG. 6. The annealing shuttle 68 by its actuator 70 then moves the annealing ring 72 into the forming station 12 below the upper forming mold 58 whose vacuum is then terminated and positive pressure air is supplied thereto to release the formed glass sheet G from its phantom line indicated position to its solid line indicated position on the annealing ring. Then, contrary to normal processing of press formed glass sheets which are normally immediately transferred from the forming station to the cooling station, the annealing ring 72 is maintained for a dwell time within the forming station below the heated upper forming mold 58 for at least three seconds and preferably for at least five seconds for slow cooling. It has been found that this slow cooling as the glass sheet cools toward and to its strain point temperature advantageously controls edge stresses upon final cooling to ambient. After the slow cooling time, the annealing shuttle 68 as is hereinafter described moves the glass sheet G on the annealing ring 72 from the forming station 12 as shown in FIG. 6 to the cooling station 18 as shown in FIG. 7 for final cooling to ambient, which will normally take place after unloading of the formed glass sheet from the annealing ring onto a cooling conveyor so the annealing ring can move back to the forming station to begin the next cycle.

The length of dwell time the annealing ring 72 must be maintained in the forming station to provide the slow cooling of the formed glass sheet to control the edge stress will vary with different glass thickness, shapes, sizes, curvatures and glass compositions, etc. As previously stated, this dwell time must be at least three seconds and for most applications at least five seconds with at least six and one half seconds for some applications. The processing involved provides edge stresses in a 20 mm band at the periphery of the glass with compression in the range of about 8 to 33 megapascals ($\approx$1160 psi to $\approx$480 psi) and tension no greater than about 7 megapascals ($\approx$1015 psi). Thus for purposes of this application, "slow" cooling means processing as described which provides edge stresses in a 20 mm peripheral band of the formed glass sheet with the above range of compression and the maximum tension specified.

As illustrated in FIGS. 1, 3 and 4, 5 as well as FIGS. 6 and 7, each embodiment of the system includes a controller 74 that is configured to control operation of the forming station, the conveyor 26, and the annealing ring movement by the annealing shuttle 68 as well as controlling all of the operations described to provide the slow cooling that produces the controlled edge stresses previously described.

Figure 8:
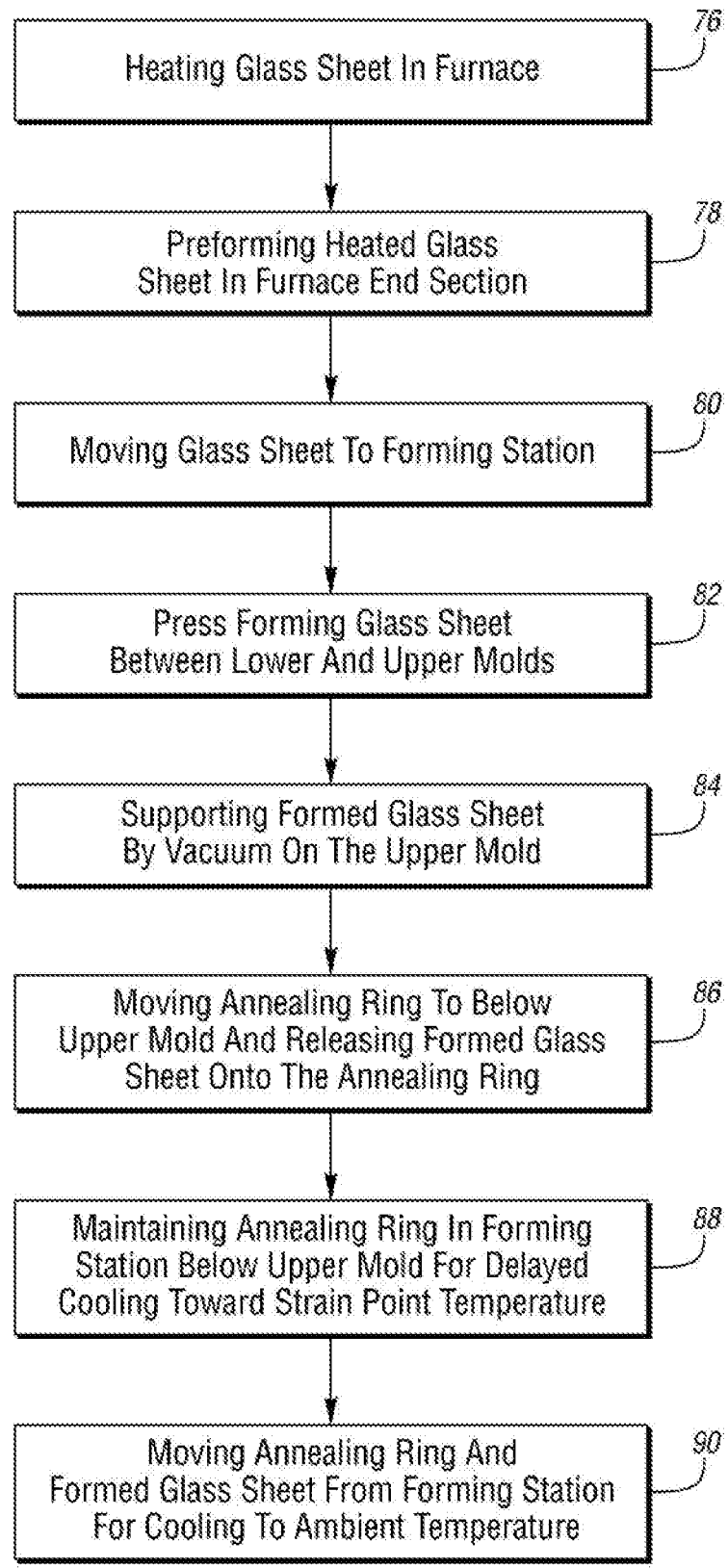
FIG. 8 is a flow chart that illustrates the steps involved in the forming and annealing with the embodiment of FIG. 1.

In FIG. 8, the illustrated flow chart describes the forming and annealing operation. More specifically, the glass sheet is initially heated in the furnace as shown at 76. Thereafter the glass sheet is preformed as described in connection with the embodiment of FIGS. 1-3 and illustrated in step 78; however, this preforming step will of course be eliminated with the embodiment of FIGS. 4 and 5 as previously described. The next step 80 moves the glass sheet to the forming station followed by the press forming step 82. Thereafter, the formed glass sheet is supported by vacuum on the upper mold as shown by step 84, and the annealing ring is then moved as shown by step 86 to below the upper mold and the glass sheet is released onto the annealing ring. After the annealing ring receives the formed glass sheet, it is maintained for the dwell time during step 88 below the upper mold for slow cooling toward the strain point temperature as previously described contrary to normal practice where the glass sheet is immediately moved to the cooling station for the annealing. Rather, the movement of the annealing ring from the forming station after the dwell time as shown by step 90 enables the formed glass sheet to have controlled edge stresses after cooling to ambient temperature as described above.

Figure 9:
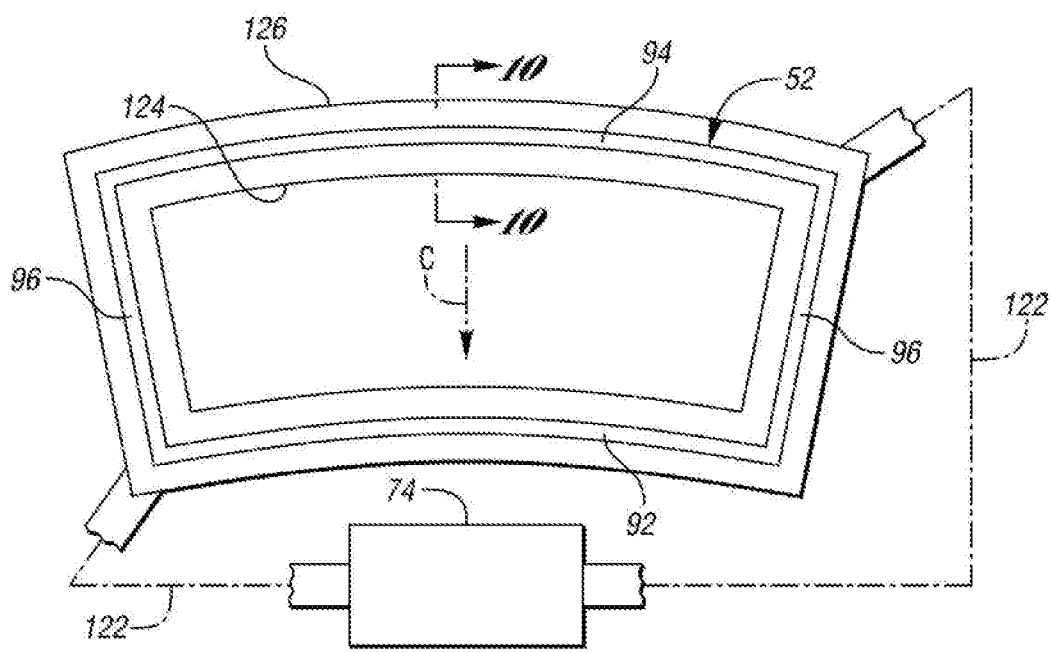
FIG. 9 is a top plan view illustrating the lower forming mold which has a ring shape as disclosed with insulation both within its interior and around its exterior.
Figure 10:
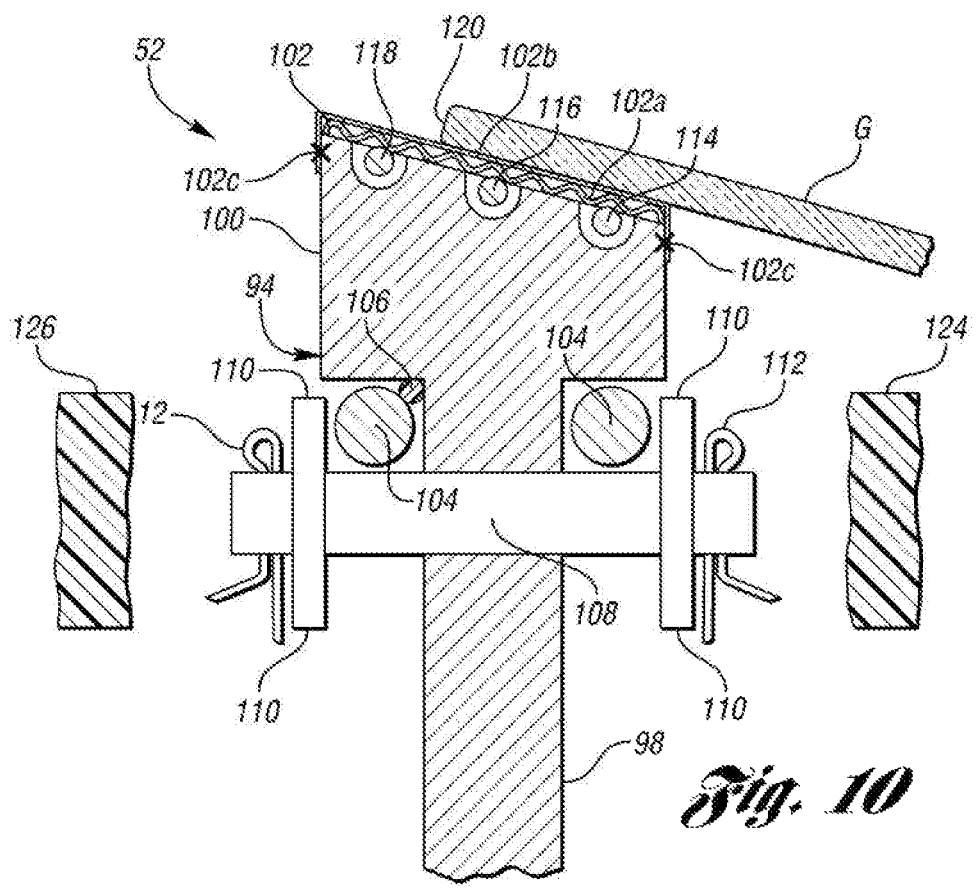
FIG. 10 is a cross sectional view taken through the lower forming mold along the direction of line 10-10 in FIG. 9 to illustrate the construction of heaters that maintain the glass edge portion heated during the press forming.

With reference to FIG. 9, the lower forming mold 52 as previously described is embodied by a press ring that has four sides, specifically downstream and upstream sides 92 and 94 and a pair of lateral sides 96. At each of these press ring sides, the press ring has a T-shaped cross section as shown in FIG. 10 including a vertical stem 98 and an upper cross bar 100 supported on the vertical stem and having an upwardly facing forming surface 102. Each side of the press ring has a pair of electrical heating elements 104 at lower locations below its cross bar 100 where it is supported on the vertical stem 98 as well as having a thermocouple 106 adjacent one of these heating elements. A shaft 108 extends through a hole in the vertical stem and has ends that receive washers 110 secured by clips 112 to position the heating elements 104. The upwardly facing forming surface 102 has three electrical heating elements 114, 116 and 118 respectively received within grooves in the forming surface 102 along its entire length and is covered by stainless steel felt 102*a* covered by a thin stainless steel layer 102*b* that is secured by tack welds 103*c* to the sides of the upper cross bar 100. The two heating elements 114 and 116 are located below the glass sheet to heat the glass sheet by conduction and radiation and the one heating element 118 is located adjacent the glass sheet edge 120 to provide radiant heating of the glass during the press forming. These heating elements 114, 116 and 118 thus limit heat loss from the glass sheet and thereby control edge stresses upon final cooling to ambient temperature. More specifically, the increased compression in the peripheral 20 mm. band extending inwardly from the edge 120 must be equal to adjacent tension. With the annealing herein disclosed, that tension is distributed more away from the edge 120 than with conventional forming and annealing. Thus there is less tension immediately adjacent the edge 120.

The controller 74 as shown in FIG. 9 has control wire bundles 122 that extend from the controller 74 to the lower press ring 52 at diagonally opposite corners as shown in FIG. 9 to provide the control of the heating elements 104, 114, 116 and 118 as well as the thermocouple 106. Thus, each bundle controls those components at two adjacent sides, either the downstream or upstream side 92 or 94 and the adjacent lateral side 96.

As also shown in FIG. 9, the lower press ring 52 has insulation 124 provided within its interior at each of its downstream and upstream sides 92 and 94 and at each of its two lateral sides 96 as well as having insulation 126 at the exterior of each of these sides. This insulation also maintains the glass sheet edge 120 and the adjacent glass sheet edge portion heated during the forming so as to aid in the slow cooling.

Figure 11:
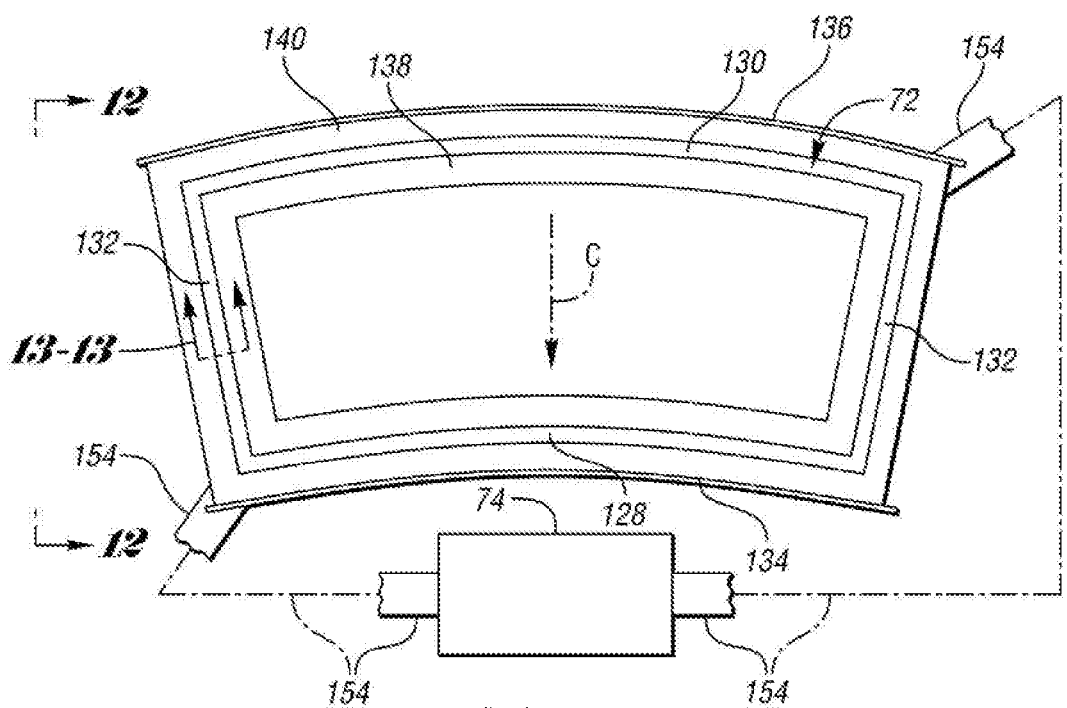
FIG. 11 is a top plan view of the annealing ring taken along the direction of line 11-11 in FIG. 6 to illustrate its construction including insulation within its interior and around its exterior as well as upstream and downstream baffles that after the dwell time limit cooling during movement of the glass sheet from the forming station.
Figure 12:
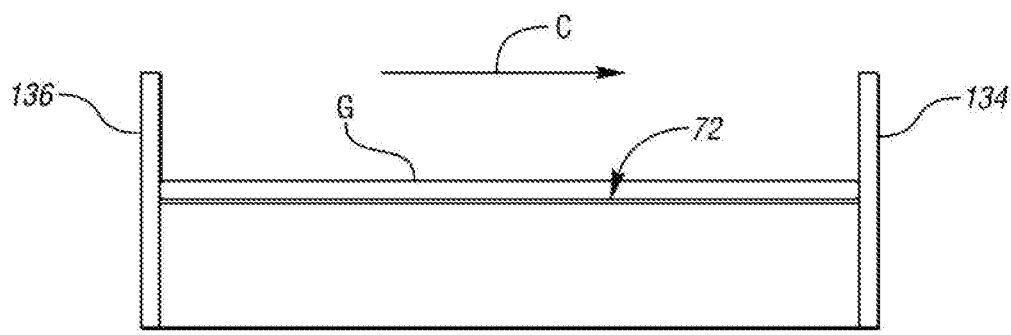
FIG. 12 is a side elevational view taken along the direction of line 12-12 in FIG. 11 to further illustrate the upstream and downstream baffles.

With reference to FIGS. 11 and 12, the annealing ring 72 like the lower press ring has four sides including a downstream side 128, an upstream side 130 and two lateral sides 132. Upwardly and downwardly extending downstream and upstream baffles 134 and 136 limit cooling from air flow across the formed glass sheet during its movement from the forming station to also prevent heat loss and thereby provide slower cooling to further control the final edge stresses. Furthermore, the annealing ring also has insulation 138 within its interior at each of its downstream and upstream sides 128 and 130 and at each of its two lateral sides 132 as well as having insulation 140 at its exterior along each of these sides to limit heat flow from the glass sheet.

The insulation 124 and 126 of the lower press ring 52 and the insulation 138 and 140 of the annealing ring 72 as well as insulation below each of these rings may be supported in the manner disclosed by Patent Application Publication US 2013/0186138, the entire disclosure of which is hereby incorporated by reference.

Figure 13:
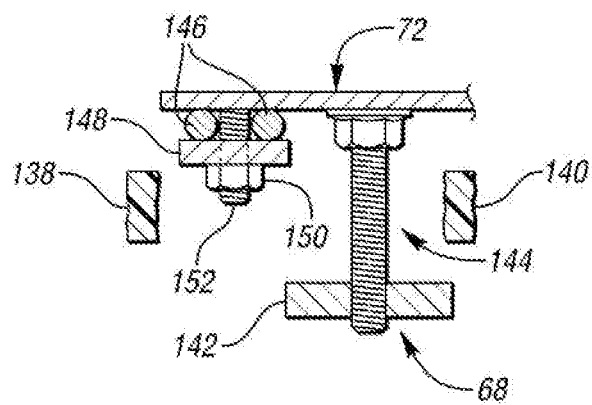
FIG. 13 is a sectional view taken along the direction of arrows 13-13 in FIG. 11 to illustrate the construction of the annealing ring along each of its four sides.

As shown in FIG. 13, the annealing ring 72 has each of its sides 128, 130 and 132 mounted on a mold support 142 of the shuttle 68 by a plurality of threaded adjusters 144 that control its elevation as required. A pair of electrical resistance heating elements 146 provide heaters that extend along each of the sides and are supported by a clip 148 and a nut 150 threaded onto a stud 152 that extends downwardly from the ring 72. Electrical control wire bundles 154 extend from the controller 74 to diagonally opposite corners of the annealing ring as shown in FIG. 11 to the heating elements and to unshown thermocouples to power and control the heating.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for glass sheet forming and annealing comprising:
    a furnace for heating a glass sheet to its forming temperature;
    a forming station located adjacent the furnace;
    a conveyor for conveying the heated glass sheet from the furnace to the forming station;
    the forming station having an upper forming mold which is heated and has a downwardly facing forming face, the forming station also having a lower forming mold that is movable upwardly to lift the heated glass sheet from the conveyor to the upper forming mold for pressing that provides the glass sheet with a formed shape, and a source of vacuum for drawing a vacuum at the upper forming mold to maintain the formed glass sheet on the upper forming mold as the lower mold is moved downwardly after the press forming;
    an annealing ring that is movable under the heated upper forming mold and the formed glass sheet supported thereon to receive the formed glass sheet upon termination of the vacuum drawn at the upper forming mold;
    a controller that controls operation of the forming station, the conveyor, and the annealing ring, and after the formed glass sheet is received by the annealing ring the controller is configured to maintain the annealing ring and the formed glass sheet thereon in the forming station below the heated upper forming mold for at least three seconds prior to movement from the forming station for slow cooling of the formed glass sheet toward the strain point temperature to control edge stresses upon final cooling to ambient temperature; and
    the annealing ring including vertically extending baffles that extend upwardly and downwardly at upstream and downstream locations relative to the direction of movement of the annealing ring from the forming station to limit cooling from air flow across the formed glass sheet during that movement.

2. A system for glass sheet forming and annealing as in claim 1 wherein the furnace includes a preforming end section having inclined bending rolls that preform the heated glass sheet prior to movement to the forming station for the press forming.

3. A system for glass sheet forming and annealing as in claim 1 wherein the system includes a roll conveyor having a flat plane of conveyance for conveying flat heated glass sheets to the forming station for the press forming.

4. A system for glass sheet forming and annealing as in claim 1 wherein the lower forming mold has four sides defining a ring shape and each side having a T-shaped cross section including a vertical stem and a crossbar supported on the vertical stem and having an upwardly facing forming surface, each side of the lower forming mold having a pair of electrical heating elements at lower locations below its crossbar where it is supported on its vertical stem, and the forming face of the crossbar of each side having three grooves and three electrical heating elements respectively received within the three grooves to limit heat loss from the glass sheet to control edge stresses upon final cooling to ambient temperature.

5. A system for glass sheet forming and annealing as in claim 4 wherein the lower forming mold has insulation within the interior and around the exterior of its ring shape.

6. A system for glass sheet forming and annealing as in claim 1 wherein the annealing ring further includes heaters and also includes insulation within its interior and around its exterior to limit heat flow from the formed glass sheet to slow its cooling.

7. A system for glass sheet forming and annealing as in claim 1 wherein the controller maintains the annealing ring and the formed glass sheet thereon in the forming station below the heated upper forming mold for at least five seconds, and for some glass sheets at least 6.5 seconds, prior to movement from the forming station for the slow cooling of the formed glass sheet toward the strain point temperature to control edge stresses upon final cooling to ambient temperature.

8. A system for glass sheet forming and annealing comprising:

a furnace for heating a glass sheet to its forming temperature;
the furnace including a preforming end section having inclined bending rolls for preforming the heated glass sheet with an upwardly concave shape;
a forming station located adjacent the furnace;
a conveyor for conveying the preformed glass sheet from the furnace to the forming station;
the forming station having an upper forming mold which is heated and has a downwardly facing forming face;
the forming station also having a lower forming mold that is movable upwardly to lift the preformed glass sheet from the conveyor to the upper forming mold for pressing that provides the glass sheet with a formed shape, the lower forming mold having four sides defining a ring shape and each side having a T-shaped cross section including a vertical stem and a crossbar supported on the vertical stem and having an upwardly facing forming surface, each side of the lower forming mold having a pair of electrical heating elements at lower locations below its crossbar where it is supported on its vertical stem, the forming face of the crossbar of each side having three grooves and three electrical heating elements respectively received within the three grooves to limit heat loss from the glass sheet, and the ring shape of the forming mold having insulation within its interior and around its exterior to also limit heat loss from the glass sheet;
a source of vacuum for drawing a vacuum at the upper forming mold to maintain the formed glass sheet on the upper forming mold as the lower mold is moved downwardly after the press forming;
an annealing ring that is movable under the heated upper forming mold and the formed glass sheet supported thereon to receive the formed glass sheet upon termination of the vacuum drawn at the upper forming mold, the annealing ring including heaters and also including upwardly and downwardly extending baffles at upstream and downstream locations relative to the direction of subsequent movement of the annealing ring from the forming station to limit cooling from air flow across the formed glass sheet during that movement, and insulation within the annealing ring and around its exterior to limit heat flow from the formed glass sheet to slow its cooling; and
a controller that controls operation of the forming station, the conveyor, and the annealing ring, and that after the formed glass sheet is received by the annealing ring the controller is configured to maintain the annealing ring and the formed glass sheet thereon in the forming station below the heated upper forming mold for at least five seconds, and for some glass sheets at least 6.5 seconds, prior to movement from the forming station so as to provide the slow cooling of the formed glass sheet to the strain point temperature and thereby control edge stresses upon final cooling to ambient temperature.

\* \* \* \* \*